United States Patent
Harai

(10) Patent No.: US 10,438,487 B2
(45) Date of Patent: Oct. 8, 2019

(54) PARKING ASSISTANCE DEVICE

(71) Applicant: Hitachi Automotive Systems, Ltd., Hitachinaka-shi, Ibaraki (JP)

(72) Inventor: Tatsunori Harai, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/760,751

(22) PCT Filed: Aug. 18, 2016

(86) PCT No.: PCT/JP2016/074071
§ 371 (c)(1),
(2) Date: Mar. 16, 2018

(87) PCT Pub. No.: WO2017/056770
PCT Pub. Date: Apr. 6, 2017

(65) Prior Publication Data
US 2018/0286240 A1    Oct. 4, 2018

(30) Foreign Application Priority Data

Sep. 30, 2015    (JP) .................................. 2015-192979

(51) Int. Cl.
*B60W 30/06* (2006.01)
*G08G 1/14* (2006.01)
(Continued)

(52) U.S. Cl.
CPC ............... *G08G 1/145* (2013.01); *B60R 1/00* (2013.01); *B60R 21/00* (2013.01); *B60W 30/06* (2013.01);
(Continued)

(58) Field of Classification Search
USPC .................................................. 701/1; 1/1
See application file for complete search history.

(56) References Cited

U.S. PATENT DOCUMENTS 9,842,346 B2 * 12/2017 Fiorucci ............. G06Q 30/0226
10,011,274 B2 * 7/2018 Holland-Letz ..... B62D 15/0285
(Continued)

FOREIGN PATENT DOCUMENTS

DE    10 2007 002 261 A1    8/2008
JP           6-187597 A    7/1994
(Continued)

OTHER PUBLICATIONS

Japanese-language International Search Report (PCT/ISA/210) issued in PCT Application No. PCT/JP2016/074071 with English translation dated Nov. 8, 2016 (two (2) pages).
(Continued)

*Primary Examiner* — Masud Ahmed
(74) *Attorney, Agent, or Firm* — Crowell & Moring LLP

(57) ABSTRACT

Provided is a parking assistance device that calculates evaluation results based on a driver's evaluation criterion with regard to a plurality of parking spaces. The parking assistance device includes a parking space recognizer configured to recognize a plurality of parking spaces; a parking space selection criterion setter configured to set a driver's parking space selection criterion; and a parking space candidate calculator configured to calculate a parking space candidate based on the parking space selection criterion.

10 Claims, 12 Drawing Sheets

(51) Int. Cl.
*B60W 50/14* (2012.01)
*B62D 6/00* (2006.01)
*B60R 21/00* (2006.01)
*B60R 1/00* (2006.01)
*B62D 15/02* (2006.01)

(52) U.S. Cl.
CPC ............... *B60W 50/14* (2013.01); *B62D 6/00* (2013.01); *G08G 1/14* (2013.01); *G08G 1/143* (2013.01); *B60R 2300/806* (2013.01); *B60W 2050/146* (2013.01); *B62D 15/027* (2013.01); *B62D 15/0285* (2013.01)

(56) References Cited

U.S. PATENT DOCUMENTS

| | | | | |
|---|---|---|---|---|
| 2005/0043871 A1* | 2/2005 | Endo | .................. | B62D 15/0275 701/36 |
| 2012/0095791 A1* | 4/2012 | Stefik | .................... | G06Q 10/02 705/5 |
| 2012/0161984 A1* | 6/2012 | Amir | .................. | G01C 21/3685 340/932.2 |
| 2013/0191189 A1* | 7/2013 | Aparicio | ................ | G07B 15/02 705/13 |
| 2014/0132767 A1* | 5/2014 | Sonnabend | ............ | G08G 1/144 348/148 |
| 2015/0063646 A1* | 3/2015 | Wang | ................. | G06K 9/00812 382/104 |
| 2015/0258989 A1* | 9/2015 | Okano | ..................... | H04N 7/18 701/1 |
| 2016/0292707 A1* | 10/2016 | Blandin | ................. | G06Q 50/30 |
| 2017/0212511 A1* | 7/2017 | Paiva Ferreira | ....... | G06Q 10/08 |

FOREIGN PATENT DOCUMENTS

| | | |
|---|---|---|
| JP | 2011-46335 A | 3/2011 |
| JP | 2013-241087 A | 12/2013 |
| JP | 2014-162451 A | 9/2014 |
| WO | WO 2013/006549 A2 | 1/2013 |

OTHER PUBLICATIONS

Japanese-language Written Opinion (PCT/ISA/237) issued in PCT Application No. PCT/JP2016/074071 dated Nov. 8, 2016 (six (6) pages).
Extended European Search Report issued in counterpart European Application No. 16850946.1 dated Sep. 17, 2018 with English translation (eight (8) pages).

* cited by examiner

PARKING ASSISTANCE DEVICE

TECHNICAL FIELD

The present invention relates to a parking assistance device.

BACKGROUND ART

Patent Literature 1 discloses a technique of displaying a remaining time to completion of parking on a display after a start of the parking in a parking assistance device configured to automatically park a vehicle in a parking space.

CITATION LIST

Patent Literature

PTL 1: JP 2013-241087A

SUMMARY

Technical Problem

In the above prior art, there is a demand for calculating evaluation results based on the driver's evaluation criterion, with regard to a plurality of parking spaces.

An object of the present disclosure is to provide a parking assistance device configured to calculate evaluation results based on the driver's evaluation criterion, with regard to a plurality of parking spaces.

Solution to Problem

The present invention calculates evaluation results with regard to a plurality of recognized parking spaces, based on the driver's evaluation criteria.

Advantageous Effects

This configuration enables the evaluation results to be calculated, based on the driver's evaluation criteria, with regard to a plurality of parking spaces.

BRIEF DESCRIPTION OF DRAWINGS

FIG. 1 is a configuration diagram illustrating a vehicle which a parking assistance device according to Embodiment 1 is applied to;

DESCRIPTION OF EMBODIMENTS

Embodiment 1

Figure 1:
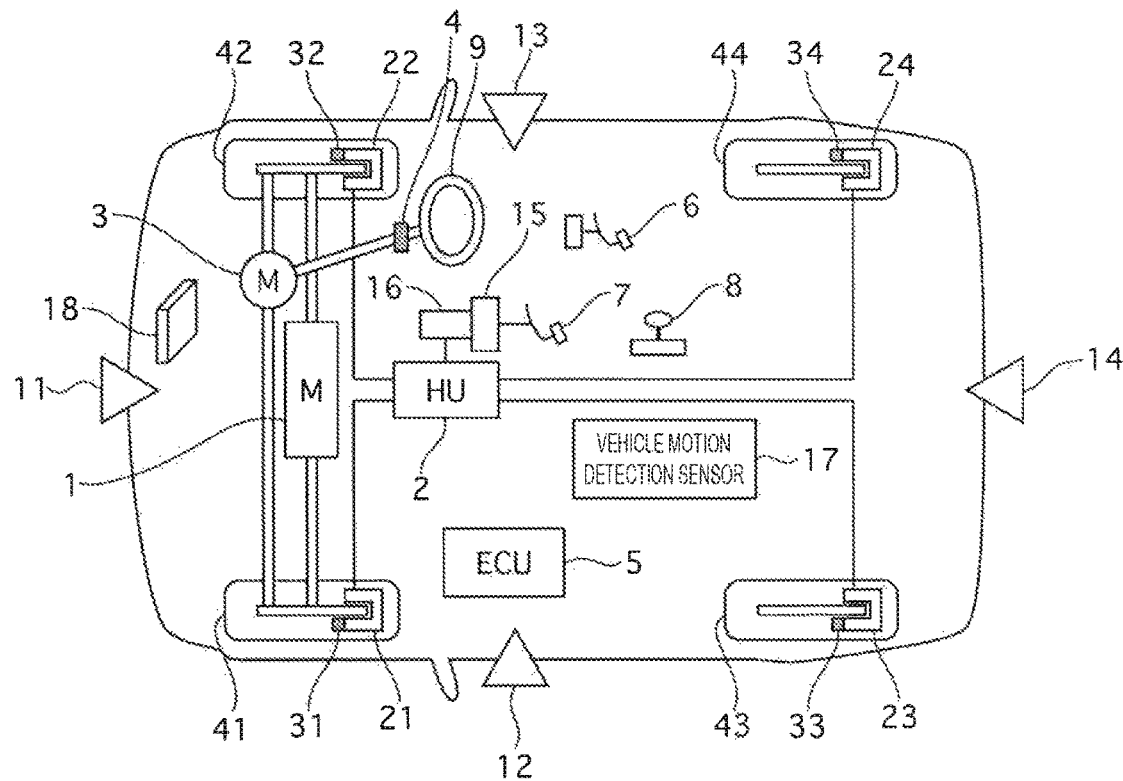

FIG. 1 is a configuration diagram illustrating a vehicle which a parking assistance device according to Embodiment 1 is applied to.

The driver operates a shift lever 8 to move the vehicle forward, to move the vehicle back or to stop the vehicle, while operating an accelerator pedal 6 to give an instruction on the driving force of a drive motor 1. The drive motor 1 may be replaced by an engine. The drive motor 1 is capable of generating a driving force or a braking force independently of the driver's accelerator pedal operation or a shift operation.

The pedal force of a brake pedal 7 is boosted by a brake booster 15, and a hydraulic pressure corresponding to the boosted force is generated in a master cylinder 16. The generated hydraulic pressure is supplied to wheel cylinders 21 to 24 via an electric hydraulic brake 2. The driver operates the brake pedal 7 to control the braking force. The electric hydraulic brake 2 includes a pump driven by a motor, a solenoid valve and the like and is configured to control the braking force of four wheels (hydraulic pressure of wheel cylinders 21 to 24) independently of the driver's brake pedal operation. The braking force of the four wheels by the driver's brake pedal operation has no difference between left and right.

An electric power steering 3 is configured to generate an assist torque corresponding to a steering torque input by the driver via a steering wheel 9. Left and right front wheels (parking drive wheels) 41 and 42 are driven by the driver's steering torque and the assist torque of the electric power steering 3, so as to turn the vehicle during vehicle running. The electric power steering 3 is capable of generating a steering torque independently of the driver's steering operation to drive the left and right front wheels 41 and 42.

Four cameras 11 to 14 are mounted on front, rear, left and right sides of the vehicle to take images of the periphery of the vehicle and recognize objects in the periphery of the vehicle. The images taken by the four cameras 11 to 14 are synthesized, and a plan view that provides a downward view of the vehicle and the periphery of the vehicle is displayed as an initial screen on the screen of a touch panel (display portion, display screen) 18. The driver may not depend on the parking assist control but may park the vehicle with viewing this plan view.

The parking assistance device of Embodiment 1 starts a parking space recognition mode when the driver touches an automatic parking mode start button displayed on the screen of the touch panel 18 in a parking lot or the like. In the parking space recognition mode, when the driver drives the vehicle to the neighborhood of any parking space, parking space candidates corresponding to the driver's parking space selecting conditions (evaluation criterion conditions) are displayed on the screen among one or a plurality of parking spaces (parking spots) recognized from the images of the cameras 11 to 14. When the driver touches one of the displayed parking space candidates, the corresponding parking space is in a selective state. When the driver touches a parking start button displayed on the screen in this state, the mode is changed from the parking space recognition mode to an automatic parking mode. The drive motor 1, the electric hydraulic brake 2 and the electric power steering 3 are then automatically controlled to cause the vehicle to reach the specified parking space.

The vehicle of Embodiment 1 is provided with a steering angle sensor 4 and wheel speed sensors 31 to 34 to control a parking route at the time of automatic parking. The electric hydraulic brake 2 has the vehicle antiskid function and the antilock brake control function, in response to sensor signals from a vehicle motion detection sensor 17 configured to detect a longitudinal acceleration, a lateral acceleration and a yaw rate, the steering angle sensor 4 and the wheel speed sensors 31 to 34. The signals of the steering angle sensor 4 and the wheel speed sensors 31 to 34 are shared with the parking assist control.

The electric devices described above are all controlled by an electronic control unit 5, and all the respective sensor signals are input into the electronic control unit 5. The respective sensor signals include an accelerator pedal operation amount, a brake pedal operation amount, a shift position and a steering torque that are the driver's operation amounts. A modification may be configured by dividing the functions of the electronic control unit 5, such that an electronic control unit may be mounted on each of the electric devices and that the respective electronic control units make communication to transmit required information therebetween.

Figure 2:
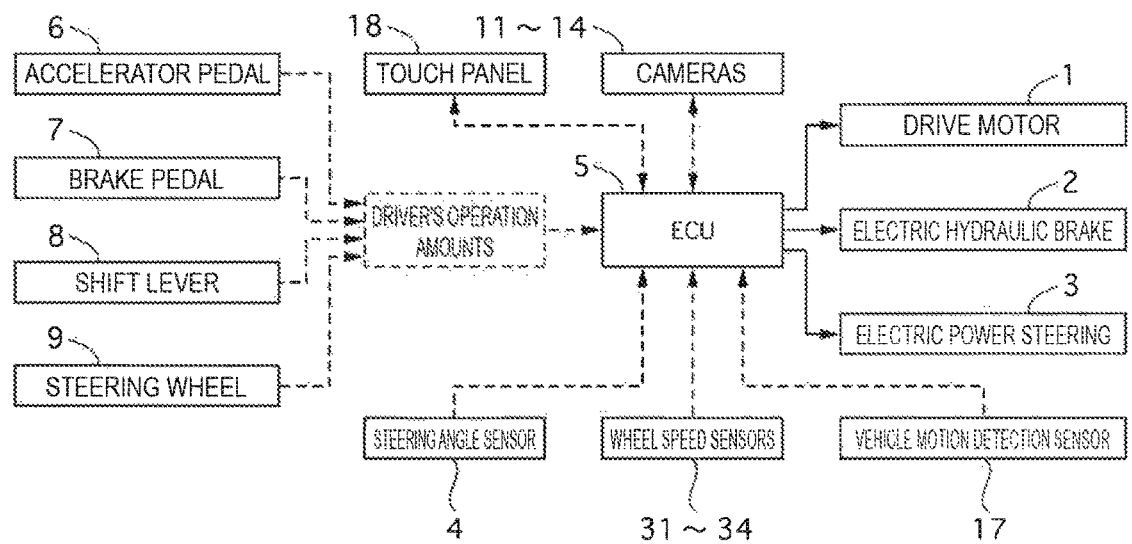
FIG. 2 is a configuration diagram illustrating the parking assistance device according to Embodiment 1.

FIG. 2 is a configuration diagram illustrating the parking assistance device according to Embodiment 1.

In the automatic parking mode, the operations of the vehicle are automatically controlled by the drive motor 1, the electric hydraulic brake 2 and the electric power steering 3. The driver's operation amounts are, however, monitored, and the driver is allowed to override the control. The driver may temporarily stop the vehicle by operating the brake pedal 7. The parking operation by automatic control is resumed after the driver releases the brake. When any obstacle enters a parking route, this configuration gives preference to the driver's braking operation and thereby prevents the vehicle from hitting against an obstacle. The parking operation by automatic control is resumed in response to a subsequent release of the operation of the brake pedal 7. This configuration automatically resumes the parking assist operation when the obstacle is away from the parking route. The parking operation by automatic control is cancelled when the driver changes the shift position or when the driver's steering torque becomes equal to or greater than a predetermined value. This configuration drives the vehicle with giving preference to the driver's shift operation or steering operation. A Cancel button 79 (shown in FIG. 11) is displayed on the screen of the touch panel 18, and the driver touches the Cancel button 79 to cancel the automatic control.

Figure 3:
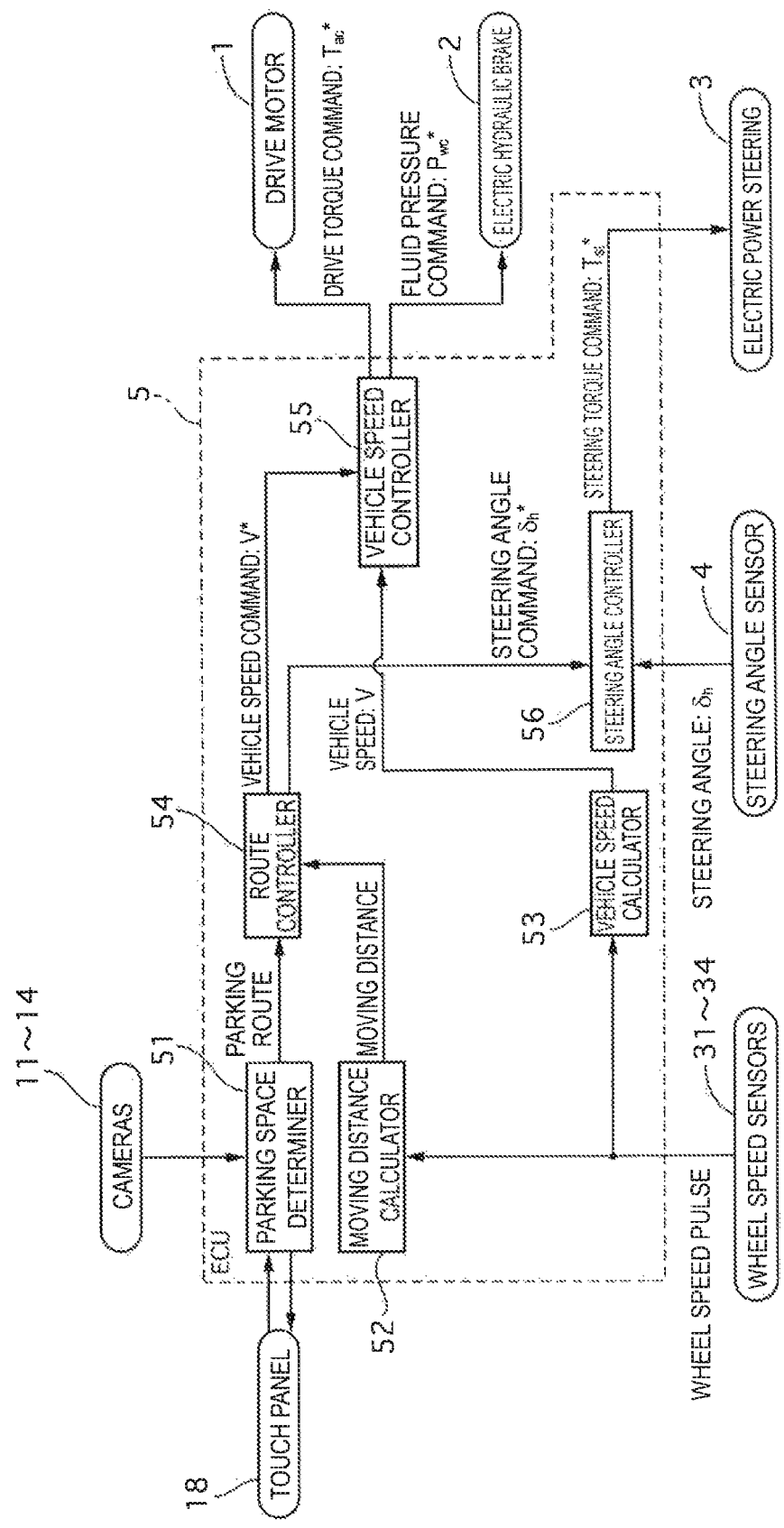
FIG. 3 is a configuration diagram showing control of parking assist.

FIG. 3 is a configuration diagram showing control of parking assist in the electronic control unit 5.

The electronic control unit 5 includes, as a configuration for achieving control of parking assist, a parking space determiner 51, a moving distance calculator 52, a vehicle speed calculator 53, a route controller 54, a vehicle speed controller 55 and a steering angle controller 56.

The parking space determiner 51 displays parking spaces corresponding to the driver's parking space selecting conditions on the screen of the touch panel 18, as parking space candidates among one or a plurality of parking spaces recognized from the images of the cameras 11 to 14, and determines a parking space candidate selected by the driver, as the parking space. The parking space determiner 51 sends a parking route for automatically parking the own vehicle in the determined parking space, to the route controller 54.

The wheel speed sensors 31 to 34 respectively generate a plurality of wheel speed pulses per one rotation of each wheel. The frequencies of the wheel speed pulses are integrated, and the moving distance calculator 52 calculates the moving distance of the vehicle. The vehicle speed calculator 53 calculates a vehicle speed V using the generation cycles of the wheel speed pulses. According to Embodiment 1, the moving distance and the vehicle speed V denote a moving distance and a vehicle speed at the center of a rear wheel axle, so that an average value of the moving distances and an average value of the wheel speeds of the left and right rear wheels 43 and 44 are specified as the calculated moving distance and the calculated vehicle speed V.

The route controller 54 determines a vehicle speed command (target value of vehicle speed) V* and a steering angle command (target value of steering angle) δh* from the parking route and the moving distance of the vehicle. The vehicle speed command is set to a predetermined speed with regard to a straight part of the parking route and is set to a speed that satisfies a predetermined maximum steering angular speed setting value and that is determined from the curvature with regard to a curved part of the parking route.

The vehicle speed controller 55 performs vehicle speed control based on the vehicle speed command V* and the vehicle speed V, and determines, as operating amounts, a drive torque command Tac* to the drive motor 1 and a fluid pressure command Pwc* to the electric hydraulic brake 2. The drive motor 1 and the electric hydraulic brake 2 generate a driving force and a braking force, in response to these commands. The driving force and the braking force may be generated by only the drive motor 1 or may be generated in a shared manner: for example, the driving force may be generated by the drive motor 1 and the braking force may be generated by the electric hydraulic brake 2. The latter method may be employed when the drive motor 1 is replaced with an engine. In Embodiment 1 that does not use the engine but uses the drive motor 1, the driving force is generated by the drive motor 1, and the braking force is generated by the electric hydraulic brake 2.

The steering angle controller 56 performs steering angle control based on the steering angle command δh* and the steering angle δh measured by the steering angle sensor 4 and determines a steering torque command Tst* as an operating amount. The electric power steering 3 generates a steering torque, in response to this command.

Figure 4:
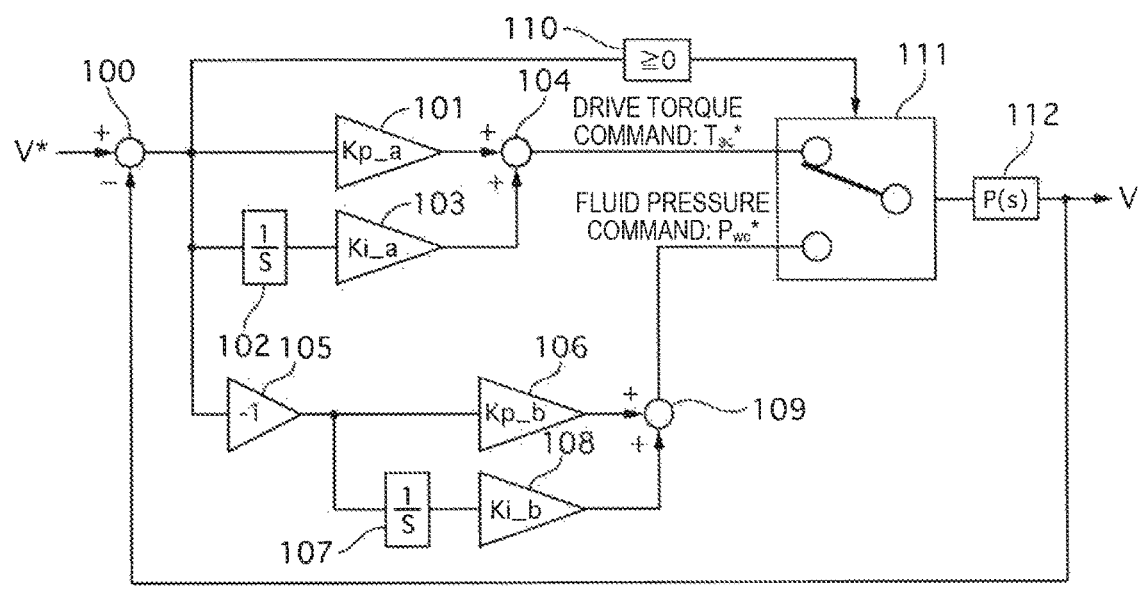
FIG. 4 is a control block diagram of a vehicle speed controller 55.

FIG. 4 is a control block diagram of the vehicle speed controller 55.

A subtractor 100 outputs a vehicle speed deviation (V*−V) by subtracting the vehicle speed V from the vehicle speed command V*.

A multiplier 101 multiplies the vehicle speed deviation by a proportional gain Kp_a.

An integrator 102 integrates the vehicle speed deviation.

A multiplier 103 multiplies the integrated value of the vehicle speed deviation by an integral gain Ki_a.

An adder 104 outputs the sum of the outputs of the two multipliers 101 and 103 as a drive torque command Tac*.

A multiplier 105 performs positive/negative inversion of the vehicle speed deviation.

A multiplier 106 multiplies the vehicle speed deviation after the positive/negative inversion by a proportional gain Kp_b.

An integrator 107 integrates the vehicle speed deviation after the positive-negative inversion.

A multiplier 108 multiplies the integrated value of the deviation after the positive-negative inversion by an integral gain Ki_b.

An adder 109 outputs the sum of the outputs of the two multipliers 106 and 108 as a fluid pressure command Pwc*.

A determiner 110 outputs a link operation selective command=1 (true) when the vehicle speed deviation is equal to or greater than 0, while outputting the link operation selective command=0 (false) when the vehicle speed deviation is less than 0.

A switch 111 outputs the drive torque command Tac* when the link operation selective command output by the determiner 110 is 1, while outputting the fluid pressure command Pwc* when the link operation selective command is 0.

A plant model (vehicle model) 112 receives input of either the drive torque command Tac* or the fluid pressure command Pwc* and outputs the vehicle speed V.

As described above, the vehicle speed controller 55 selectively uses the drive motor 1 and the electric hydraulic brake 2 according to the positive/negative of the vehicle speed deviation (V*−V) by PI control. When the vehicle speed deviation is equal to or greater than 0, the drive motor 1 is driven with the drive torque command Tac* that is calculated by using the proportional gain Kp_a and the integral gain Ki_a, in order to make the vehicle speed V closer to the vehicle speed command V* with the driving force by the drive motor 1. In this state, no braking force is generated by setting the fluid pressure command Pwc* to the electric hydraulic brake 2 to 0. When the vehicle speed deviation is less than 0, on the other hand, the electric hydraulic brake 2 is driven with the fluid pressure command Pwc* that is calculated by using the proportional gain Kp_b and the integral gain Ki_b, in order to make the vehicle speed V closer to the vehicle speed command V* with the braking force by the electric hydraulic brake 2. In this state, no driving force is generated by setting the drive torque command Tac* to the drive motor 1 to 0.

Figure 5:
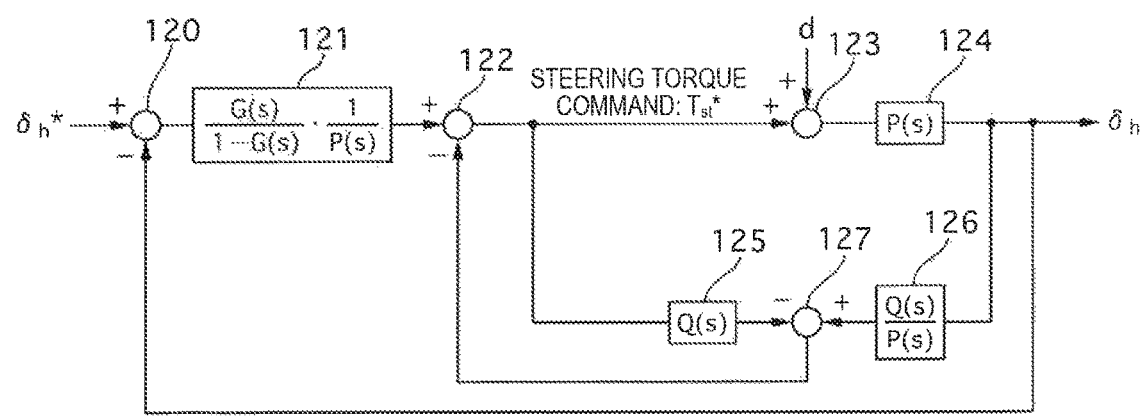
FIG. 5 is a control block diagram of a steering angle controller 56.

FIG. 5 is a control block diagram of the steering angle controller 56. This control is two-degree freedom control using a disturbance observer that cancels out a disturbance d, and freely sets a steering angle response by a target response G.

A subtractor 120 outputs a steering angle deviation ($\delta h^* - \delta h$) by subtracting the steering angle $\delta h$ from the steering angle command $\delta h^*$.

A model matching compensator 121 is a feedback compensator that receives input of the steering angle deviation and outputs an ideal steering torque that makes the steering angle deviation equal to a desired target response G that is given previously.

A subtractor 122 subtracts an estimated disturbance torque from the ideal steering torque and outputs the difference as a steering torque command Tst*.

An adder 123 adds the disturbance d to the steering torque command Tst*.

A plant model (vehicle model) 124 receives input of the disturbance-added steering torque command and outputs a steering angle $\delta h$.

A noise filter portion 125 performs a filtering process of the steering torque command Tst* by a lowpass filter.

An inverse plant model 126 performs a filtering process of a steering torque command that gives the steering angle $\delta h$ with a lowpass filter that is identical with the lowpass filter used in the noise filter portion 125.

A subtractor 127 subtracts the output of the noise filter portion 125 from the output of the inverse plant model 126 and outputs the difference as the estimated disturbance torque.

Figure 6:
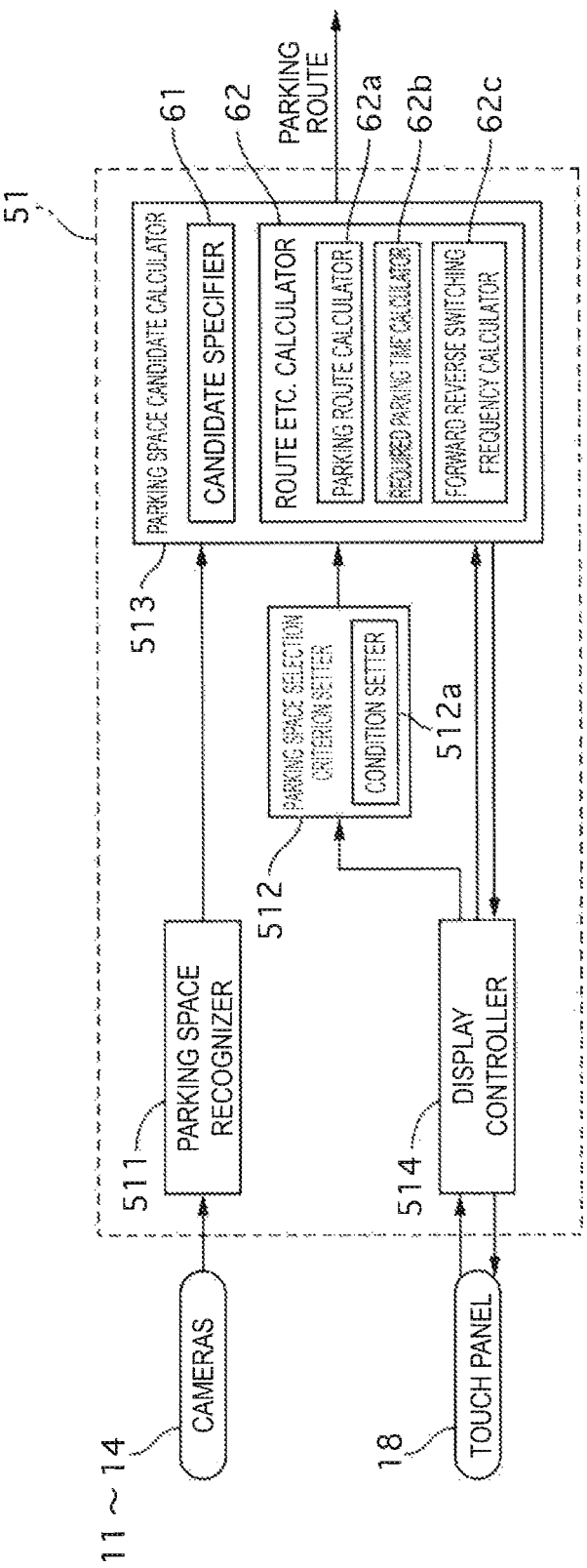
FIG. 6 is a control block diagram of a parking space determiner 51 according to Embodiment 1.

FIG. 6 is a control block diagram of the parking space determiner 51.

A parking space recognizer 511 recognizes a plurality of parking spaces from the images taken by the cameras 11 to 14 and sends information (coordinates and the like) regarding the plurality of recognized parking spaces to a parking space candidate calculator.

a parking space selection criterion setter (evaluation criterion setter) 512 sets parking space selection criteria (evaluation criteria) used to calculate parking spaces that are to be provided to the driver as parking space candidates, among the plurality of parking spaces recognized by the parking space recognizer 511. According to Embodiment 1, factors relating to the time axis, i.e., a required parking time and a forward reverse switching frequency, are used as the parking space selection criteria. The required parking time denotes a required parking time duration that is required to move the own vehicle along a parking route from a parking assist start position (for example, current position) to a parking space (for example, a middle position of a parking spot). The forward reverse switching frequency denotes the number of times of forward motions and reverse motions in one set. In the case of reverse parking, for example, the forward reverse switching frequency is 0 for only one reverse motion, is 1 for one forward motion and one subsequent reverse motion, is 2 for one forward motion, one subsequent reverse motion, one subsequent forward motion and one subsequent reverse motion. In the case of forward parking, the reverse motion and the forward motion described above are exchanged. The parking space selection criterion setter 512 includes a condition setter 512a. The condition setter 512a sets parking space selecting conditions (an upper limit of parking time and an upper limit of forward reverse switching frequency). The parking space selecting conditions are set by the driver's screen entry to the touch panel 18.

A parking space candidate calculator 513 includes a candidate specifier 61 and a route etc. calculator 62. The candidate specifier 61 specifies, as parking space candidates, parking spaces that satisfy part or all of the parking space selecting conditions (for example, conditions that the required parking time is equal to or less than the upper limit of parking time and that the forward reverse switching frequency is equal to or less than the upper limit of forward reverse switching frequency) set by the condition setter 512a out of the parking space selection criteria set by the parking space selection criterion setter 512, among a plurality of parking spaces available to automatically park the vehicle (available to set parking routes for automatically parking the vehicle) that are determined by the route etc. calculator 62. The route etc. calculator 62 calculates a plurality of parking spaces available to automatically park the vehicle among the plurality of parking spaces recognized by the parking space recognizer 511, calculates parking routes, vehicle speed commands and the like with regard to the plurality of calculated parking spaces, and sends the calculation results to the candidate specifier 61. The route etc. calculator 62 includes a parking route calculator 62a, a required parking time calculator 62b and a forward reverse switching frequency calculator 62c. The parking route calculator 62a calculates parking routes from a parking assist start position to a plurality of parking spaces, with regard to the respective parking space candidates. The required parking time calculator 62b calculates required parking times that are required to move the own vehicle along the plurality of parking routes from the assist start position to the respective parking spaces, with regard to the respective parking space candidates. The forward reverse switching frequency calculator 62c calculates forward reverse switching frequencies when the own vehicle moves along the plurality of parking routes from the parking assist start position to the respective parking spaces, with regard to the respective parking space candidates.

The display controller 514 displays information regarding the parking space candidates calculated by the parking space candidate calculator 513 on the touch panel 18 and prompts the driver to select a parking space. The driver touches one of a plurality of parking space candidates displayed on the touch panel 18 to select a parking space. The selected parking space is shown in a selected state by providing a decorated display (for example, highlighted display) different from those of the other parking spaces. The display controller 514 outputs the selected parking space to the parking space candidate calculator 513. The parking space candidate calculator 513 outputs a parking route for the selected parking space. The display controller 514 also displays the setting details of the parking space selecting conditions on the touch panel 18. When the driver operates the touch panel 18 to update the parking space selecting conditions, the update details are output to the condition setter 512a.

Figure 7:
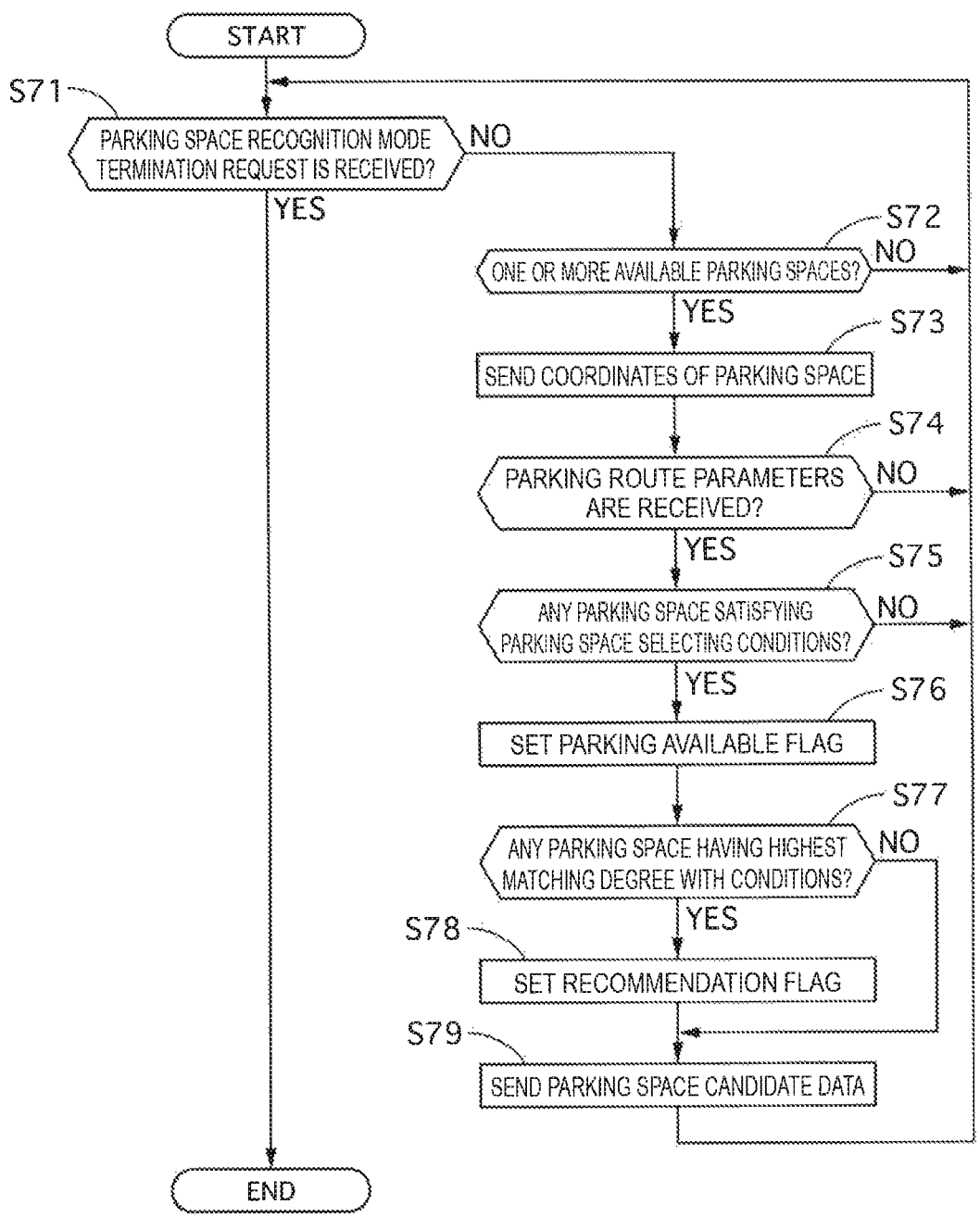
FIG. 7 is a flowchart showing a processing flow of a candidate specifier 61 in a parking space recognition mode.
Figure 8:
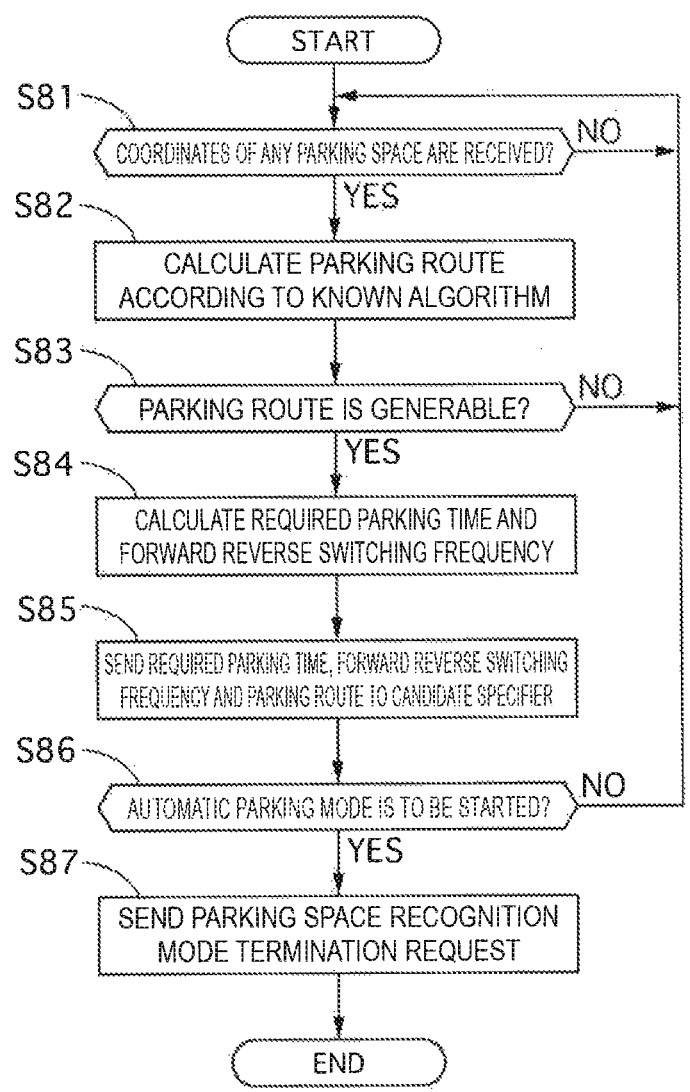
FIG. 8 is a flowchart showing a processing flow of a route etc. calculator 62 in the parking space recognition mode.
Figure 9:
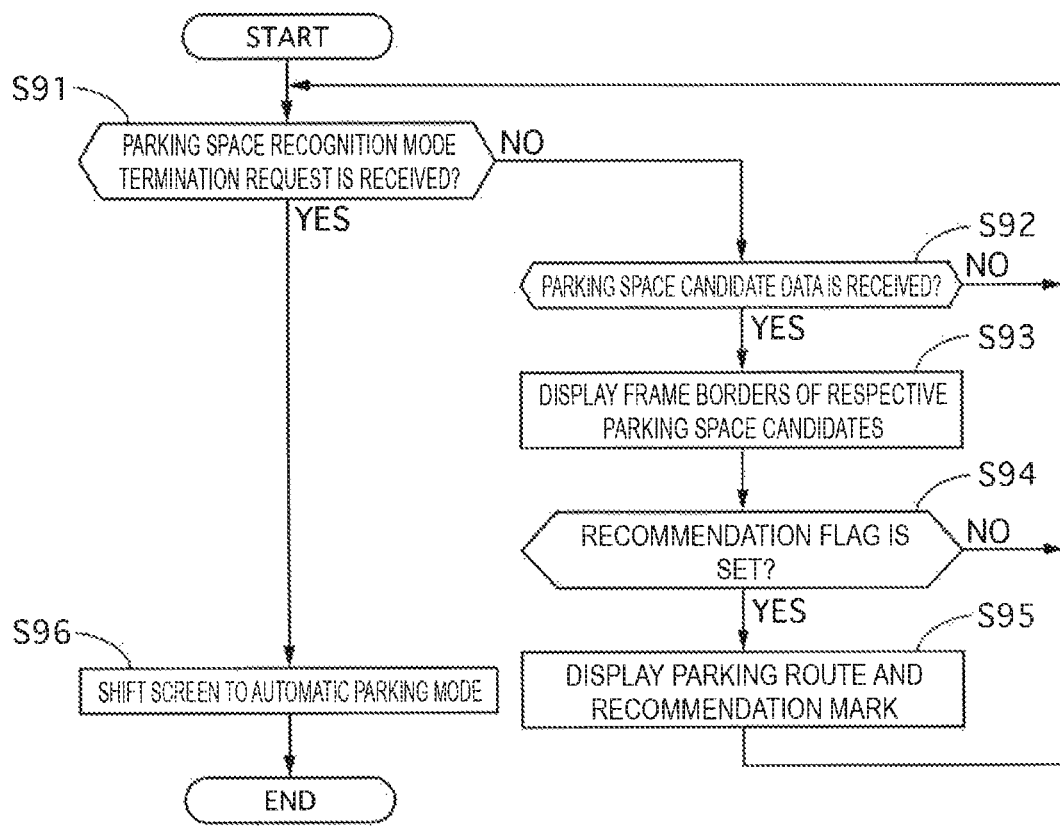
FIG. 9 is a flowchart showing a processing flow of a display controller 514 in the parking space recognition mode.

The following describes the processing of the candidate specifier 61, the route etc. calculator 62 and the display controller 514 in the parking space recognition mode with reference to FIGS. 7 to 9.

FIG. 7 is a flowchart showing a processing flow of the candidate specifier 61 in the parking space recognition mode.

At step S71, the candidate specifier 61 determines whether a parking space recognition mode termination request is received from the route etc. calculator 62. In the case of YES, the processing is terminated. In the case of NO, the processing proceeds to step S72. The description starts from the processing of FIG. 7.

At step S72, the candidate specifier 61 determines whether one or more parking spaces available to automatically park the vehicle are recognized by the parking space recognizer 511. In the case of YES, the processing proceeds to step S73. In the case of NO, the processing returns to step S71.

At step S73, the candidate specifier 61 sends coordinates of the parking space to the route etc. calculator 62.

At step S74, the candidate specifier 61 determines whether parking route parameters (distance of a parking route, a vehicle speed command and the like) are received from the route etc. calculator 62. In the case of YES, the processing proceeds to step S75. In the case of NO, the processing returns to step S71.

At step S75, the candidate specifier 61 determines whether there is any parking space satisfying the parking space selecting conditions. In the case of YES, the processing proceeds to step S76. In the case of NO, the processing returns to step S71.

At step S76, the candidate specifier 61 sets a parking available flag.

At step S77, the candidate specifier 61 determines whether there is any parking space candidate having the highest matching degree with the parking space selecting conditions. In the case of YES, the processing proceeds to step S78. In the case of NO, the processing proceeds to step S79.

At step S78, the candidate specifier 61 sets a recommendation (preference) flag for the parking space candidate having the highest matching degree with the parking space selecting conditions.

At step S79, the candidate specifier 61 sends parking space candidate data to the display controller 514.

FIG. 8 is a flowchart showing a processing flow of the route etc. calculator 62 in the parking space recognition mode.

At step S81, the route etc. calculator 62 determines whether the coordinates of any parking space are received from the candidate specifier 61. In the case of YES, the processing proceeds to step S82. In the case of NO, the processing repeats step S81.

At step S82, the route etc. calculator 62 calculates a parking route to each parking space according to a known algorithm.

At step S83, the route etc. calculator 62 determines whether a parking route is generable for at least one parking space. In the case of YES, the processing proceeds to S84. In the case of NO, the processing returns to step S81.

At step S84, the route etc. calculator 62 calculates a required parking time and a forward reverse switching frequency with regard to the parking space for which the parking route is generable, i.e., the parking space available to automatically park the vehicle. The required parking time is calculated from a moving distance of the vehicle and an average value of a vehicle speed command and additionally from a time required for a shift change. A method employed to calculate the vehicle speed command is identical with the method employed in the route controller 54.

At step S85, the route etc. calculator 62 sends the required parking time, the forward reverse switching frequency and the parking route to the candidate specifier 61.

At step S86, the route etc. calculator 62 determines whether the automatic parking mode is to be started. In the case of YES, the processing proceeds to step S87. In the case of NO, the processing returns to step S81. At this step, it is determined that the automatic parking mode is to be started, in response to the driver's press of a parking start button displayed on the touch panel 18.

At step S87, the route etc. calculator 62 sends the parking space recognition mode termination request to the candidate specifier 61 and the display controller 514.

FIG. 9 is a flowchart showing a processing flow of the display controller 514 in the parking space recognition mode.

At step S91, the display controller 514 determines whether the parking space recognition mode termination request is received from the route etc. calculator 62. In the case of YES, the processing is terminated. In the case of NO, the processing proceeds to step S92.

At step S92, the display controller 514 determines whether the parking space candidate data is received from the candidate specifier 61. In the case of YES, the processing proceeds to step S93. In the case of NO, the processing returns to step S91.

At step S93, the display controller 514 displays frame borders of parking space candidates on the screen of the touch panel 18.

At step S94, the display controller 514 determines whether the recommendation flag is set. In the case of YES, the processing proceeds to step S95. In the case of NO, the processing returns to step S91.

At step S95, the display controller 514 displays a parking route of the parking space candidate having the highest matching degree with the parking space selecting conditions set by the driver and a recommendation mark on the screen of the touch panel 18.

At step S96, the display controller 514 shifts the screen to the automatic parking mode.

Figure 11:
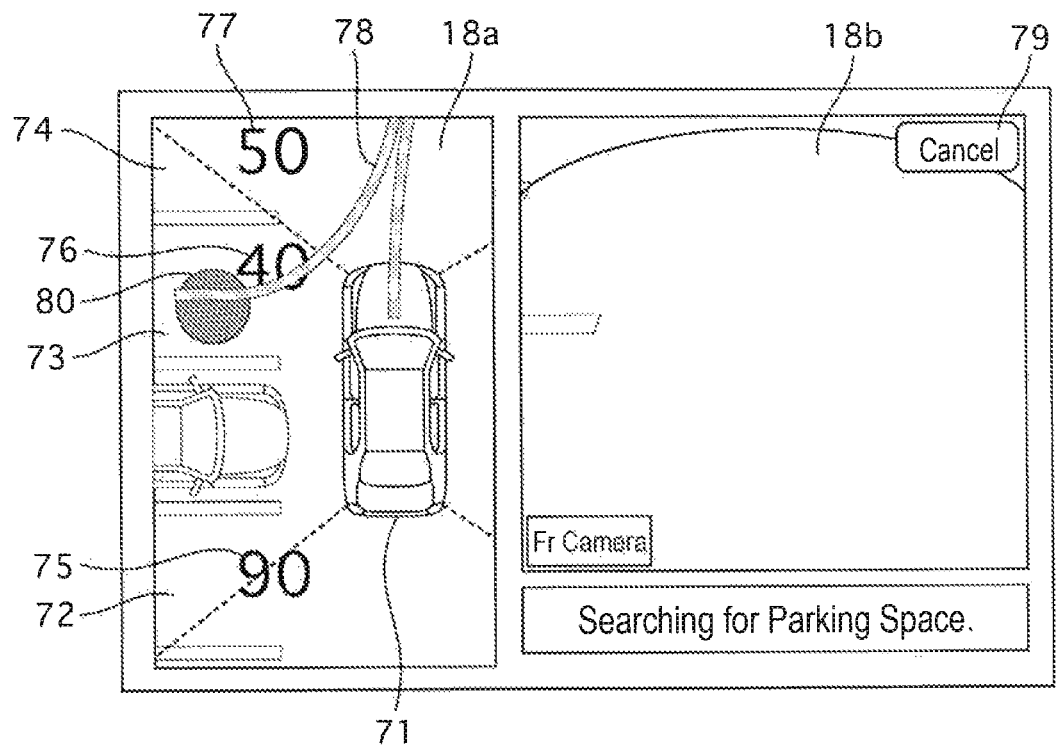
FIG. 11 is a diagram illustrating a display example of parking space candidates.

FIG. 11 illustrates a display example of parking space candidates. The screen of the touch panel 18 is divided into two right and left parts, i.e., a parking space candidate display part 18a and a camera image display part 18b. An own vehicle 71 and three parking space candidates 72 to 74 are displayed as a plan view in the parking space candidate display part 18a. Required parking times 75 to 77 are shown in the frames of the respective parking space candidates 72 to 74. Display/non-display of the required parking times and the forward reverse switching frequencies may be changed over via the driver's screen entry to the touch panel 18. Between the respective parking space candidates 72 to 74, the frame of the parking space candidate 73 which the recommendation flag is set in and which has the highest matching degree with the parking space selecting conditions (the shortest parking time and the lowest forward reverse switching frequency) has highlighted display indicating a default selected state and includes display of a recommendation mark 80 in a circular shape. A parking route 78 corresponding to the selected parking space candidate 73 is displayed additionally. When the driver touches one of the other parking space candidates in this state, the highlighted display is shifted to the newly touched parking space candidate and a parking route for the newly touched parking space candidate is displayed. Displaying the parking route enables the driver to visually check any obstacle that may not be recognized by the cameras 11 to 14 and thereby enhances the safety. An image of a camera in the moving direction (front camera 11 in the example of FIG. 11) is displayed in the camera image display part 18b. A Cancel button 79 which the driver touches to cancel automatic parking is displayed at an upper right corner of the camera image display part 18b. In the parking space recognition mode, a message showing searching for a parking space is displayed on the lower side of the camera image display part 18b.

Figure 12:
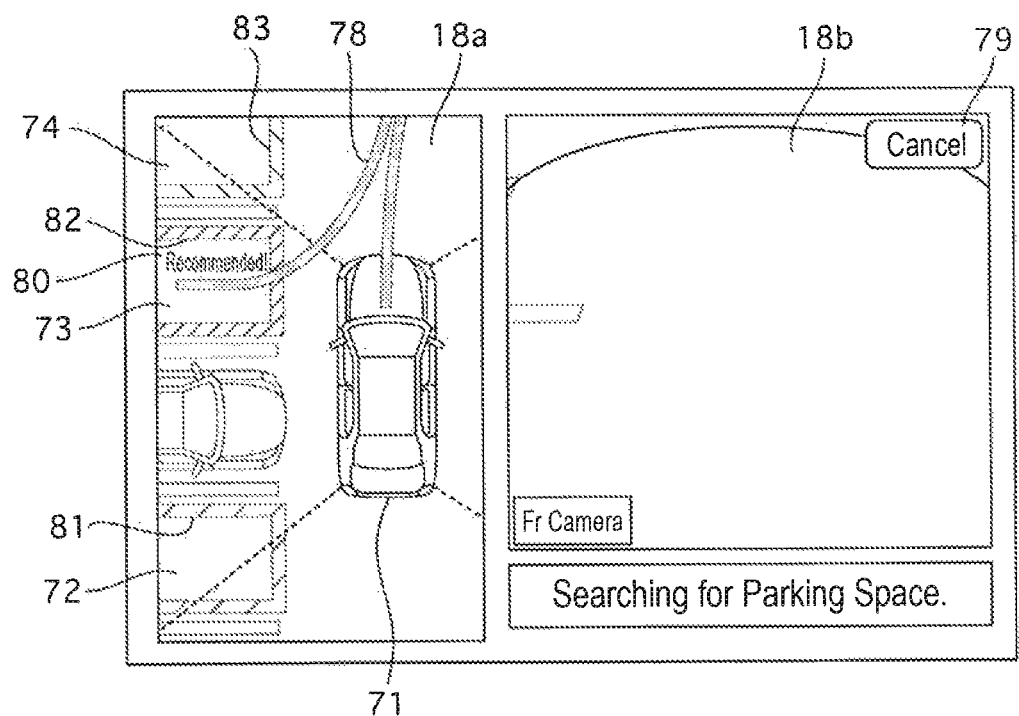
FIG. 12 is a diagram illustrating another display example of parking space candidates.

The recommendation mark 80 may be replaced by a character string such as "Recommended!" as shown in FIG. 12. Furthermore, rectangular shape lines 81 to 83 may be respectively shown in the frames of the respective parking space candidates 72 to 74 including the parking space candidates without the recommendation flag. The respective rectangular shape lines 81 to 83 may have different colors to distinguish the difference in matching degree at first glance. The colors of the rectangular shape lines may be, for example, green, yellow and red in descending order of the matching degree. Any of various highlighted displays may be employed: for example, the higher matching degree may be indicated by the thicker rectangular shape line or may be indicated by the higher blink rate.

Figure 10:
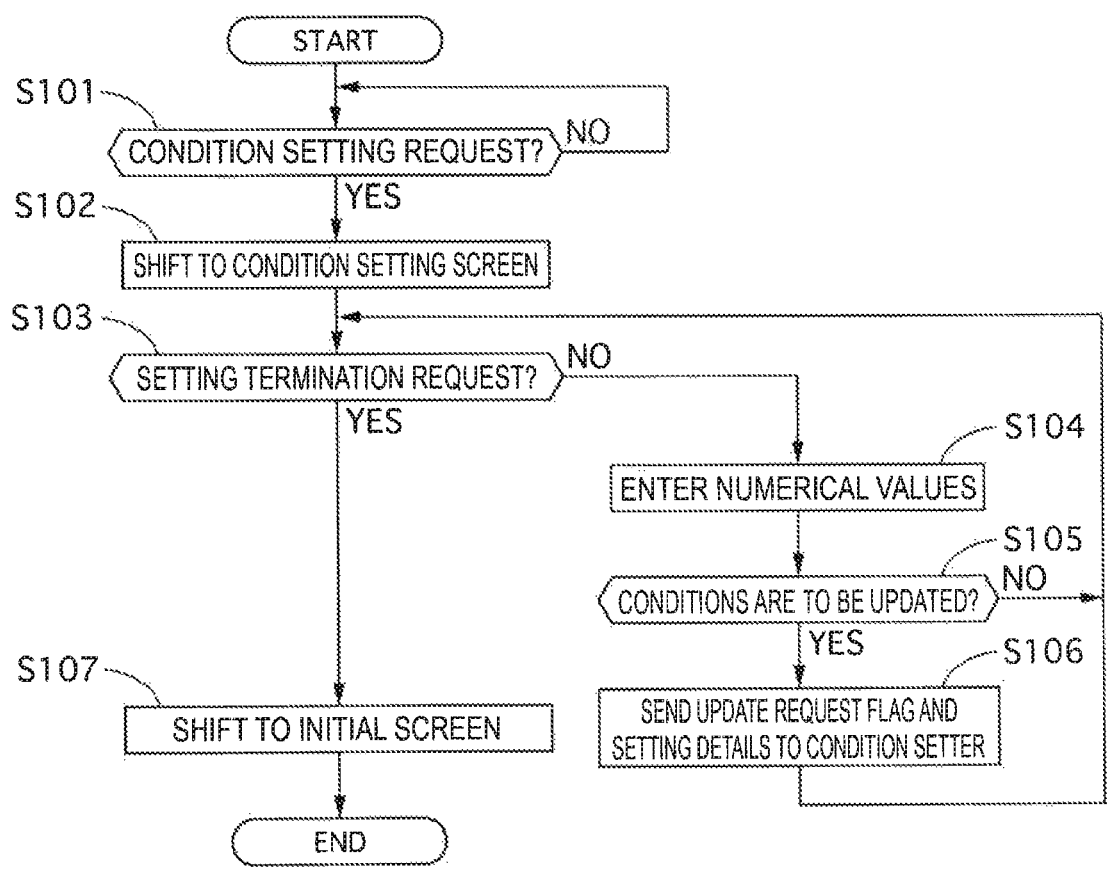
FIG. 10 is a flowchart showing a processing flow of the display controller 514 when the driver sets parking space selecting conditions.

FIG. 10 is a flowchart showing a processing flow of the display controller 514 when the driver sets the parking space selecting conditions.

At step S101, the display controller 514 determines whether there is a condition setting request. In the case of YES, the processing proceeds to step S102. In the case of NO, the processing returns to step S101. At this step, it is determined that there is a condition setting request when the driver touches a condition setting button displayed on the screen of the touch panel 18.

Figure 13:
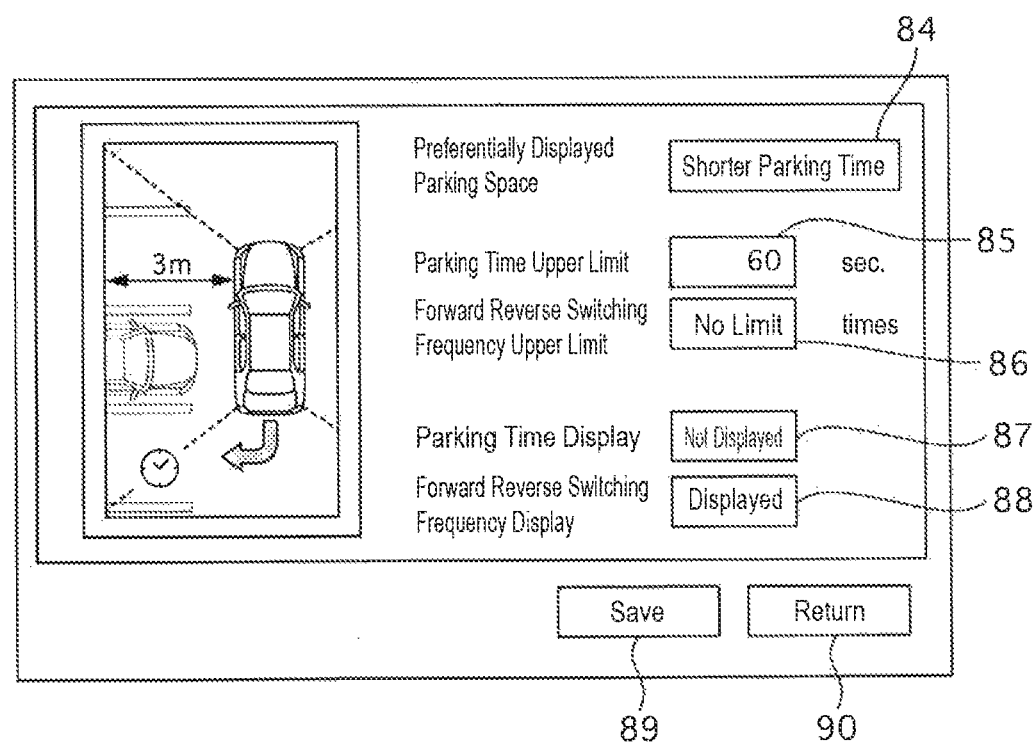
FIG. 13 is a diagram illustrating a display example of a condition setting screen.

At step S102, the display is shifted to a condition setting screen. FIG. 13 illustrates a display example of the condition setting screen. The screen of the touch panel 18 includes display of respective set buttons 84 to 88, a Save button 89 and a Return button 90. The current settings are shown in the respective set buttons 84 to 88. When the driver touches each set button, a pulldown menu appears to allow for the driver's entry of a numerical value or the like. The preferentially displayed parking space set button 84 is a button operated by the driver to set a condition of a parking space to be preferentially displayed (for example, the shorter parking time or the lower forward reverse switching frequency). The parking time upper limit set button 85 is a button operated by the driver to set an upper limit of required parking time (number of seconds or no upper limit). For example, when the upper limit is 60 seconds, the display does not include any parking space candidate that has the required parking time exceeding 60 seconds. The forward reverse switching frequency upper limit set button 86 is a button operated by the driver to set an upper limit (number of times or no upper limit) of forward reverse switching frequency. For example, when the upper limit is one time, the display does not include any parking space candidate that has the forward reverse switching frequency exceeding one time. The parking time display set button 87 is a button operated to set whether a required parking time is to be displayed along with each parking space candidate. The forward reverse switching frequency display set button 88 is a button operated to set whether a forward reverse switching frequency is to be displayed along with each parking space candidate. The Save button 89 is a button operated to save the respective set conditions. The Return button 90 is a button operated to shift the display from the condition setting screen to an initial screen.

At step S103, the display controller 514 determines whether there is a setting termination request. In the case of YES, the processing proceeds to step S107. In the case of NO, the processing proceeds to step S104. At this step, it is determined that there is a setting termination request when the driver touches either the Save button or the Return button in the condition setting screen.

At step S104, the driver enters numerical values (parking space selecting conditions).

At step S105, the display controller 514 determines whether the parking space selecting conditions are to be updated. In the case of YES, the processing proceeds to step S106. In the case of NO, the processing returns to step S103. At this step, it is determined that the parking space selecting conditions are to be updated when the driver touches the Save button in the condition setting screen.

At step S106, the display controller 514 sends an update request flag and the setting details to the condition setter 512a. The condition setter 512a updates the parking space selecting conditions to the received setting details.

At step S107, the display is shifted to the initial screen.

The prior art parking assistance device has a known configuration that shows a remaining time to completion of parking on a display after a start of parking. This configuration, however, merely provides a time required for parking with regard to a parking space determined in advance. When there are a plurality of parking spaces near to the own vehicle in a parking lot or the like, this configuration fails to provide information useful for the driver's selection of a parking space (information usable as a hint for decision-making).

The parking assistance device of Embodiment 1, on the other hand, calculates the required parking times and the forward reverse switching frequencies respectively with regard to a plurality of parking space candidates recognized from the images of the cameras 11 to 14 and displays the calculation results on the screen of the touch panel 18. When there are a plurality of parking spaces, this configuration provides information useful for the driver's selection of a parking space (the required parking time and the forward reverse switching frequency). The driver is thus allowed to determine an appropriate parking space among the plurality of parking space candidates, based on the display of the required parking times and the forward reverse switching frequencies.

The parking space candidates displayed on the screen of the touch panel 18 are those corresponding to the parking space selecting conditions set by the driver. This configuration accordingly suppresses useless (unrequired) information from being displayed on the screen of the touch panel 18. In other words, this configuration provides only the information useful for the driver's selection of a parking space.

Embodiment 1 has advantageous effects described below.

(1) The parking assistance device includes the parking space recognizer 511 configured to recognize a plurality of parking spaces; the parking space selection criterion setter 512 configured to set the driver's parking space selection criterion; and the evaluation result calculator (parking space candidate calculator 513) configured to calculate evaluation results with regard to the plurality of parking spaces, based on the parking space selection criterion.

This configuration enables the evaluation results to be calculated, based on the driver's parking space selection criterion, with regard to the plurality of parking spaces.

(2) In the parking assistance device described in (1), the evaluation result calculator is the parking space candidate calculator 513 configured to calculate a parking space candidate as the evaluation result.

This configuration enables the parking space candidate to be calculated, based on the driver's parking space selection criterion, among the plurality of parking spaces.

(3) The parking assistance device described in (2) further includes the parking route calculator 62a configured to calculate respective parking routes from a parking assist start position to the plurality of parking spaces. The parking space selection criterion setter 512 sets a required parking time that is required for parking, as the evaluation criterion. The parking space candidate calculator 513 includes the required parking time calculator 62b configured to calculate respective required parking times that are required when the own vehicle moves along the plurality of parking routes. The parking space candidate calculator 513 calculates the parking space candidate, based on the plurality of required parking times.

This configuration enables the parking space candidate to be calculated, based on the time required for parking and thereby enables the driver's desired parking space candidate to be calculated when the driver gives priority to the time.

(4) In the parking assistance device described in (3), the parking space selection criterion setter 512 sets an allowable parking time that is allowed by the driver, as the evaluation criterion. The parking space candidate calculator 513 calculates a parking space having the required parking time that is equal to or shorter than the allowable parking time, as the parking space candidate, among the plurality of parking spaces.

This configuration calculates a parking space candidate that meets the driver's parking space selecting condition.

(5) In the parking assistance device described in (4), the parking space selection criterion setter 512 includes the condition setter 512a configured to cause the driver to set a parking space selecting condition. The parking space candidate calculator 513 sets a priority in relation to the condition and calculates a parking space of a higher priority, as the parking space candidate.

This configuration calculates a parking space candidate that is close to the driver's parking space selecting condition.

(6) The parking assistance device described in (5) further includes the touch panel 18 configured to display the parking space candidate.

This configuration enables the driver to visually recognize the parking space candidate and thereby readily perceive the parking space candidate.

(7) The parking assistance device described in (2) further includes a parking route calculator 62a configured to calculate respective parking routes from a parking assist start position to the plurality of parking spaces. The parking space selection criterion setter 512 sets a forward reverse switching frequency required for parking, as the evaluation criterion. The parking space candidate calculator 513 includes the forward reverse switching frequency calculator 62c configured to calculate respective switching frequencies when the own vehicle moves along the plurality of parking routes. The parking space candidate calculator 513 calculates the parking space candidate, based on the plurality of switching frequencies.

This configuration enables the parking space candidate to be calculated, based on the forward reverse switching frequency and thereby enables the driver's desired parking space candidate to be calculated when the driver gives priority to the forward reverse switching frequency.

(8) In the parking assistance device described in (7), the parking space selection criterion setter 512 sets an allowable switching frequency that is allowed by the driver, as the evaluation criterion. The parking space candidate calculator 513 calculates a parking space having the switching frequency that is equal to or less than the allowable switching frequency, as the parking space candidate, among the plurality of parking spaces.

This configuration calculates a parking space candidate that meets the driver's parking space selecting condition.

(9) In the parking assistance device described in (8), the parking space selection criterion setter 512 includes the condition setter 512a configured to cause the driver to set a parking space selecting condition. The parking space candidate calculator 513 sets a priority in relation to the condition and calculates a parking space of a higher priority, as the parking space candidate.

This configuration calculates a parking space candidate that is close to the driver's parking space selecting condition.

(10) The parking assistance device described in (9) further includes the touch panel 18 configured to display the parking space candidate.

This configuration enables the driver to visually recognize the parking space candidate and thereby readily perceive the parking space candidate.

(11) In the parking assistance device described in (2), the parking space selection criterion setter 512 includes the condition setter 512a configured to cause the driver to set a parking space selecting condition. The parking space candidate calculator 513 sets a priority in relation to the condition and calculates a parking space of a higher priority, as the parking space candidate.

This configuration calculates a parking space candidate that is close to the driver's parking space selecting condition.

(12) The parking assistance device described in (11) further includes the parking route calculator 62a configured to calculate respective parking routes from a parking assist start position to the plurality of parking spaces. The parking space candidate calculator 513 includes the required parking time calculator 62b configured to calculate respective required parking times that are required when the own vehicle moves along the plurality of parking routes; and the forward reverse switching frequency calculator 62c configured to calculate respective switching frequencies when the own vehicle moves along the plurality of parking routes. The parking space candidate calculator 513 calculates a parking space having a calculated required parking time and a calculated switching frequency corresponding to conditions set by the driver, as the parking space candidate, among the plurality of parking spaces.

This configuration enables the parking space candidate to be calculated, based on the time required for parking and the forward reverse switching frequency and thereby enables the driver's desired parking space candidate to be calculated when the driver gives priority to the time and to the forward reverse switching frequency.

(13) The parking assistance device includes the parking space recognizer 511 configured to recognize a plurality of parking spaces; the required parking time calculator 62b configured to assist parking of the own vehicle with regard to the plurality of parking spaces and calculate respective parking times when the own vehicle moves from a parking start position to a parking completion position; the forward reverse switching frequency calculator 62c configured to calculate respective forward reverse switching frequencies during parking assist of the own vehicle from the parking start position to the parking completion position; and the parking space candidate calculator 513 configured to calculate a parking space candidate, based on the plurality of parking times and the plurality of switching frequencies, among the plurality of parking spaces.

This configuration enables the parking space candidate to be calculated, based on the time required for parking and the forward reverse switching frequency and thereby enables the driver's desired parking space candidate to be calculated when the driver gives priority to the time and to the forward reverse switching frequency.

(14) The parking assistance device includes the cameras 11 to 14 configured to take information on the periphery of the own vehicle; the parking space recognizer 511 configured to recognize a plurality of parking spaces from the information of the cameras 11 to 14; the condition setter 512a configured to cause the driver to set a parking space selecting condition; the parking space candidate calculator 513 configured to relate information corresponding to the parking space selecting condition to each of the plurality of parking spaces and calculate a parking space candidate corresponding to the condition, among the plurality of parking spaces; and the touch panel 18 configured to display the parking space candidate.

This configuration uses the cameras 11 to 14 to recognize a plurality of parking spaces near to the own vehicle. This configuration also enables the driver to visually and readily perceive a parking space candidate corresponding to the parking space selecting condition that is set by the driver.

Embodiment 2

Figure 14:
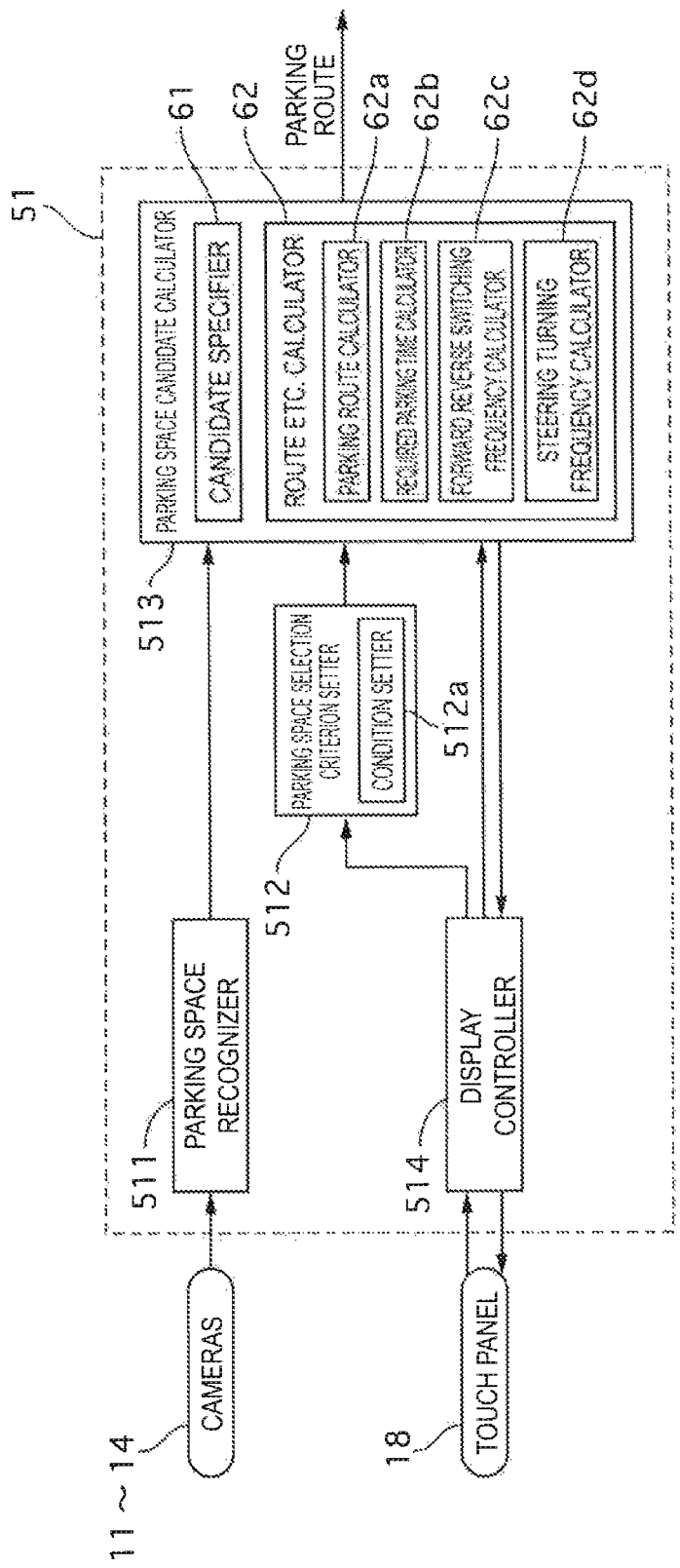
FIG. 14 is a control block diagram of the parking space determiner 51 according to Embodiment 2.

The following describes Embodiment 2. Embodiment 2 has a basic configuration that is similar to that of Embodiment 1, so that only the differences are described below. FIG. 14 is a control block diagram of the parking space determiner 51 according to Embodiment 2. A steering turning frequency calculator 62d calculates respective left right turning frequencies of a steering with regard to the respective parking space candidates. The left right turning frequency may be calculated from a parking route. The driver is allowed to set an upper limit (number of times or no upper limit) of the left right turning frequency via a condition setting screen.

Embodiment 2 has advantageous effects described below.

(15) The parking assistance device described in (2) further includes the parking route calculator 62a configured to calculate respective parking routes from a parking assist start position to the plurality of parking spaces. The parking space candidate calculator 513 includes the steering turning frequency calculator 62d configured to calculate respective turning frequencies of the steering with regard to the plurality of parking routes. The parking space calculator 513 calculates the parking space candidate, based on the turning frequencies.

This configuration enables the parking space candidate to be calculated, based on the left right turning frequency of the steering and thereby enables the driver's desired parking space candidate to be calculated when the driver gives priority to the left right turning frequency.

The following describes technical aspects that may be understood from the embodiments.

(a) In the drive assistance device disclosed herein, the parking assistance device further includes a condition setter configured to cause a driver to set conditions of parking time and switching frequency. The parking space candidate calculator calculates a parking space having a calculated parking time and a calculated switching frequency corresponding to the condition, as the parking space candidate.

This configuration calculates a parking space candidate corresponding to the driver's desired condition.

(b) In the drive assistance device described in (a), the parking assistance device includes a configuration that the parking space candidate calculator sets a priority in relation to the condition and calculates a parking space of a higher priority, as the parking space candidate.

This configuration calculates a parking space candidate that is close to the driver's desired condition.

(c) In the drive assistance device described in (b), the parking assistance device further includes a display portion configured to display the parking space candidate.

This configuration enables the driver to visually recognize the parking space candidate and thereby readily perceive the parking space candidate.

(d) In the drive assistance device disclosed herein, the parking assistance device includes a configuration that the condition is set via the display screen.

This configuration enables the driver to visually set the condition and thereby facilitates condition setting.

The foregoing describes only some embodiments of the present invention. As readily understandable by a person skilled in the art, the illustrated embodiments may be subjected to various changes or modifications without substantially departing from the novel teachings and advantages of the present invention. Accordingly, aspects including such changes or modifications are intended to be included in the technical scope of the present invention.

The present application claims priority to Japanese patent application No. 2015-192979 filed on Sep. 30, 2015. The entirety of the disclosure including the specification, the claims, the drawings and the abstract of Japanese patent application No. 2015-192979 filed on Sep. 30, 2015 is hereby incorporated by reference into this application.

The entirety of the disclosure including the specification, the claims, the drawings and the abstract of JP 2013-241087A (Patent Literature 1) is hereby incorporated by reference into this application.

REFERENCE SIGNS LIST 11-14 cameras
18 touch panel (display portion, display screen)
62a parking route calculator
62b required parking time calculator (parking time calculator)
62c forward reverse switching frequency calculator
62d steering turning frequency calculator
511 parking space recognizer
512 parking space selection criterion setter (evaluation criterion setter)
512a condition setter
513 parking space candidate calculator (evaluation criterion calculator)

The invention claimed is:

1. A parking assistance device comprising:
a parking space recognizer configured to recognize a plurality of parking spaces;
an evaluation criterion setter configured to set a driver's evaluation criterion;
a parking space candidate calculator configured to calculate, based on the set driver's evaluation criterion, evaluation results with regard to the plurality of parking spaces to calculate a plurality of parking space candidates; and
a display portion configured to display concurrently the plurality of parking space candidates in such a manner that one parking space candidate is selectable from among the plurality of parking space candidates, wherein
the parking assistance device is configured to perform automatic parking in a parking space corresponding to the selected parking space candidate.

2. The parking assistance device according to claim 1, further comprising:
a parking route calculator configured to calculate respective parking routes from a parking assist start position to the plurality of parking spaces, wherein
the evaluation criterion setter sets a required parking time that is required for parking, as the evaluation criterion, and
the parking space candidate calculator comprises a required parking time calculator configured to calculate respective required parking times that are required when an own vehicle moves along the plurality of parking routes, and the parking space candidate calculator calculates the plurality of parking space candidates, based on the plurality of required parking times.

3. The parking assistance device according to claim 2, wherein the evaluation criterion setter sets an allowable parking time that is allowed by the driver, as the evaluation criterion, and
the parking space candidate calculator calculates parking spaces each having the required parking time that is equal to or shorter than the allowable parking time, as the plurality of parking space candidates, among the plurality of parking spaces.

4. The parking assistance device according to claim 3, wherein the evaluation criterion setter comprises a condition setter configured to cause the driver to set a condition of the evaluation criterion, and
the parking space candidate calculator sets a priority in relation to the condition and calculates parking spaces each having a higher priority, as the plurality of parking space candidates.

5. The parking assistance device according to claim 1, further comprising:
a parking route calculator configured to calculate respective parking routes from a parking assist start position to the plurality of parking spaces, wherein
the evaluation criterion setter sets a forward reverse switching frequency required for parking, as the evaluation criterion, and
the parking space candidate calculator comprises a switching frequency calculator configured to calculate respective switching frequencies when an own vehicle moves along the plurality of parking routes, and the parking space candidate calculator calculates the plurality of parking space candidates, based on the plurality of switching frequencies.

6. The parking assistance device according to claim 5, wherein the evaluation criterion setter sets an allowable switching frequency that is allowed by the driver, as the evaluation criterion, and
the parking space candidate calculator calculates parking spaces each having the switching frequency that is equal to or less than the allowable switching frequency, as the plurality of parking space candidates, among the plurality of parking spaces.

7. The parking assistance device according to claim 6, wherein the evaluation criterion setter comprises a condition setter configured to cause the driver to set a condition of the evaluation criterion, and
the parking space candidate calculator sets a priority in relation to the condition and calculates parking spaces each having a higher priority, as the plurality of parking space candidates.

8. The parking assistance device according to claim 1, wherein the evaluation criterion setter comprises a condition setter configured to cause the driver to set a condition of the evaluation criterion, and
the parking space candidate calculator sets a priority in relation to the condition and calculates parking spaces each having a higher priority, as the plurality of parking space candidates.

9. The parking assistance device according to claim 8, further comprising:
a parking route calculator configured to calculate respective parking routes from a parking assist start position to the plurality of parking spaces, wherein
the parking space candidate calculator comprises a required parking time calculator configured to calculate respective required parking times that are required when an own vehicle moves along the plurality of parking routes; and a switching frequency calculator configured to calculate the respective switching frequencies when the own vehicle moves along the plurality of parking routes, and the parking space candidate calculator calculates a parking spaces each having a calculated required parking time and a calculated switching frequency corresponding to conditions set by the driver, as the plurality of parking space candidates, among the plurality of parking spaces.

10. The parking assistance device according to claim 1, further comprising:
a parking route calculator configured to calculate respective parking routes from a parking assist start position to the plurality of parking spaces, wherein
the parking space candidate calculator comprises a switching frequency calculator configured to calculate respective turning frequencies of a steering with regard to the plurality of parking routes, and the parking space calculator calculates the plurality of parking space candidates, based on the turning frequencies.

* * * * *